June 21, 1938.   C. D. STEWART ET AL   2,121,553
RESERVOIR RELEASE VALVE DEVICE
Filed March 23, 1937
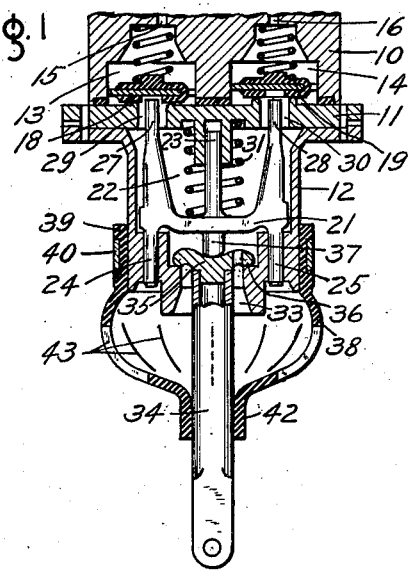
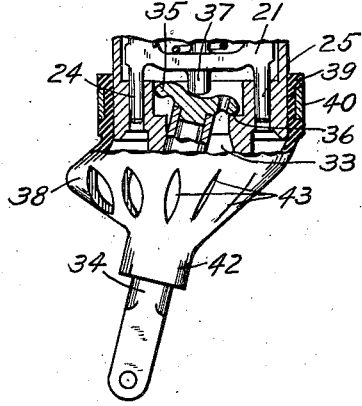
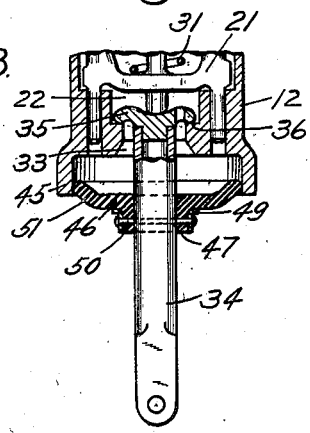
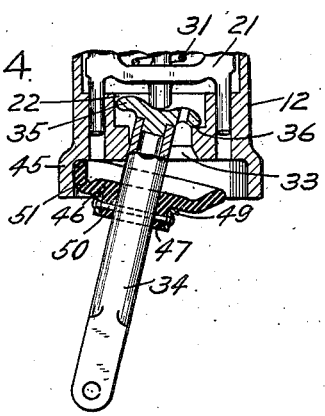
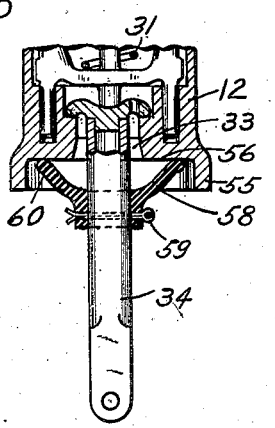
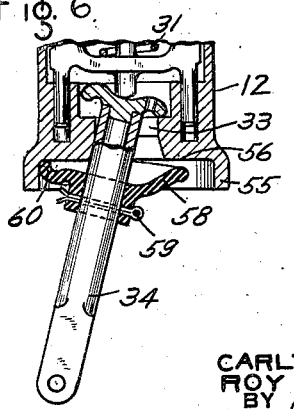
INVENTORS
CARLTON D. STEWART
ROY R. STEVENS
BY Wm. M. Cady
ATTORNEY Patented June 21, 1938

2,121,553

UNITED STATES PATENT OFFICE 2,121,553

RESERVOIR RELEASE VALVE DEVICE

Carlton D. Stewart, Swissvale, and Roy R. Stevens, Forest Hills, Pa., assignors to The Westinghouse Air Brake Company, Wilmerding, Pa., a corporation of Pennsylvania Application March 23, 1937, Serial No. 132,460

5 Claims. (Cl. 303—1)

This invention relates to valve devices, and more particularly to a reservoir release valve adapted to be employed with a fluid pressure brake apparatus.

It is customary to provide a reservoir release valve device on a vehicle equipped with a fluid pressure brake, in order to permit venting of fluid under pressure from one or more of the storage reservoirs when desired. The reservoir release valve device is adapted to be controlled manually, and is usually mounted in a more or less exposed position beneath the vehicle body. When the vehicle is operated during cold weather, ice is sometimes formed on the reservoir release valve device, and may so clog operative parts thereof as to prevent the desired operation of the device if an attempt is made to drain the storage reservoir.

One object of the invention is to provide means adapted to prevent access of snow and water to the operative portions of a reservoir release valve device without in any way interfering with the usual operation of the device.

Another object of the invention is to provide means for preventing formation of ice on a reservoir release valve device in such manner as to interfere with the normal operation thereof, which means is adapted to assist in maintaining the valve device in its normal or closed postion.

In the accompanying drawing, Fig. 1 is a vertical sectional view of a reservoir release valve device embodying one form of my invention; Fig. 2 is a fragmentary view, partly in section, of the release valve device shown in the release or open position thereof; Figs. 3 and 4 are sectional views showing another form of release valve device embodying the invention and illustrated in closed and discharge positions respectively; and Figs. 5 and 6 are sectional views illustrating still another form of the invention, the valve device being shown in different positions.

For the purpose of illustration my invention is shown associated with a reservoir release valve device of the type disclosed in the United States Patent No. 2,012,718 issued to Ellis E. Hewitt, and as shown in Fig. 1 of the drawing of release valve device comprises a casing section 10 which may be carried by the casing of the usual brake controlling valve device, not shown, a valve seat member 11 mounted on the casing section 10, and a body or cover 12 secured to the seat member 11. Suitable means such as bolts, now shown, may be provided for clamping the casing sections together. Formed in the casing section 10 are valve chambers 13 and 14, which are connected to the usual storage reservoirs, such as the auxiliary and emergency reservoirs, by way of passages 15 and 16 respectively. The release valves 18 and 19 are disposed in the respective chambers 13 and 14 and are adapted normally to engage suitable seat ribs formed on the valve seat member 11 as shown in the drawing.

The cover 12 has formed therein a chamber 22 having an atmospheric discharge opening 33. Disposed in the chamber 22 is a crosshead 21 having an upwardly extending guide pin 23 slidably mounted in a suitable bore formed in a portion of the valve seat member 11, and a pair of downwardly extending guide pins 24 and 25 slidably mounted in parallel bores formed in the cover 12. Two upwardly projecting fingers 27 and 28 are formed on the crosshead 21, and extend through apertures 29 and 30 formed in the valve seat member 11 into operative alignment with the valves 18 and 19, respectively. A spring 31 is interposed between the crosshead 21 and the valve seat member 11 for urging the crosshead downwardly to the position shown in the drawing. For actuating the crosshead 21 there is provided an operating member 34, the upper end of which extends through the discharge opening 33 and is provided with an apertured circular portion 35 which is normally held in engagement with an annular shoulder 36 formed on the cover 12 by the pressure of the spring 31 acting through the medium of a lug 37 formed centrally on the crosshead 21.

According to the invention, a bulbous shield 38 is provided for preventing access of water or snow to the reservoir release valve device by way of the discharge opening 33, the shield 38 being made of a resilient material such as rubber, and having an annular flange portion 39 fitted around the lower portion of the cover 12 and clamped thereto by means of a clamping ring 40. The lowermost portion of the shield 38 is tapered inwardly to form an annular neck portion 42 which has a snug fit with the downwardly extending operating member 34. The flexible shield 38 is provided with a series of slits 43 formed in the portion thereof intermediate the flange 39 and the neck 42.

When it is desired to operate the reservoir release valve device, the operating member 34 is tilted out of its normal position so that the circular portion 35 thereof is pivoted at one point of engagement with the annular shoulder 36, as is best shown in Fig. 2 of the drawing, with the result that the circular portion 35 forces the crosshead 21 upwardly against the pressure of the spring 31 and thus causes the fingers 27 and 28 to move the respective release valves 18 and 19 away from their seats. Fluid under pressure is then vented from the storage reservoirs associated with the reservoir release valve device to the atmosphere by flow through the passages 15 and 16, past the unseated release valves and through apertures 29 and 30 to the chamber 22 within the cover 12 and thence through the discharge opening 33.

With the operating member 34 thus tilted into the position shown in Fig. 2, the flexible shield 38 is distorted in such a manner as to cause a certain member of the slits 43 to spread open, thereby establishing communication through which fluid under pressure is free to flow from the discharge opening 33 to the atmosphere.

It will be apparent that while the reservoir release valve device remains in the normal or closed position shown in Fig. 1, the flexible shield 38 is adapted to prevent access of water to operating portions of the valve device, and that if ice is formed on the outer surface of the flexible shield 38, such ice will be quickly cracked and scaled away from the shield upon operation of the operating member 34.

Another form of our invention is shown in Fig. 3 of the drawing, in which the cover 12 is provided with an enlarged flange portion 45 formed on the lowermost portion thereof and surrounding the discharge opening 33. A circular shield 46 made of flexible rubber or the like is mounted on the operating member 34 and is adapted to cooperate with the flange 45 protecting the discharge opening of the release valve device.

The shield 46 has a flange 47 formed around the central aperture therein through which the operating member 34 extends, which flange is clamped against the operating member by means of a clamping ring 49 and a rivet 50, which is disposed transversely through suitable bores in the operating member 34 and the flange 47 and ring 49 for securing said elements together. An outwardly extending lip portion 51 is formed on the shield 46, the periphery of the lip portion normally engaging the inner annular surface of the flange 45.

When the operating member 34 is tilted to operate the reservoir release valve device, one side of the flexible shield 46 is thrust against the annular flange 45, the lip portion 51 thereof yielding due to its inherent resiliency so as to permit the other side of the shield 46 to be moved away from the flange 45, thereby permitting fluid under pressure to flow through the discharge opening 33 to the atmosphere.

Referring to Fig. 5 of the drawing, there is illustrated another form of our invention which is adapted, in addition to protecting the valve device from the effect of water and snow, to constitute a means for urging the operating member 34 toward its normal position. In this form of our invention, the cover 12 is provided with an enlarged cylindrical flange portion 55 formed around a flat sealing face 56 which surrounds the discharge opening 33.

Carried on the operating member 34 is a flexible cup-shaped shield 58, which has a central aperture through which the operating member extends, and which may be secured in place by any suitable means such as the cotter pin 59 shown in the drawing. The diameter of the cup-shaped shield 58 is less than that of the flange 55, and the shield is so positioned on the operating member 34 that the annular lip portion 60 thereof is normally held in sealing engagement with the sealing surface 56. By reason of the concave form of the resilient shield 58, the lip 60 is caused to bear against the sealing surface 56 with considerable force, so as normally to aid the spring 31 to urge the operating member 34 into the position shown in Fig. 5.

When the operating member 34 is moved to the position shown in Fig. 6 for venting the storage reservoirs, the shield 58 is shifted along the seat surface 56 until one side of the shield engages the flange 55, continued movement of the operating member then causing the shield to flex in a manner similar to that in the case of the shield 51 in Fig. 3 already described. Fluid under pressure is thus permitted to flow freely through the discharge opening 33 to the atmosphere.

It will thus be apparent that according to our invention means is provided which will effectively prevent access of water and snow to the operative parts of a reservoir release valve device, thereby avoiding the possibility of formation of ice on the valve device in such a manner as to interfere with the desired operation.

While three illustrative embodiments of the invention have been described in detail, it is not our intention to limit its scope to those embodiments or otherwise than by the terms of the appended claims.

Having now described my invention, what I claim as new and desire to secure by Letters Patent, is:

1. The combination with a fluid pressure release valve device comprising a casing having a discharge aperture, valve means for controlling the release of fluid under pressure through said discharge aperture, and a movable member for actuating said valve means, of means for preventing access of water to said aperture comprising a flexible shield made of resilient material, said shield having one portion fitted on said movable member, and another portion adapted to cooperate with said casing for normally closing said discharge opening and operative upon movement of said member for flexing said shield out of the normal position to open a communication through which fluid under pressure vented through said aperture may flow.

2. The combination with a fluid pressure release valve device including a casing having a discharge orifice, valve means operative to release fluid under pressure through said orifice, and a movable member having one end extending through said orifice and pivotally mounted in said casing for operating said valve means, of a shield made of resilient material for preventing access of water to said valve device and having a portion secured to said member, said shield having a flexible portion adapted to cooperate with said casing for normally closing said orifice and means operative by distortion of the shield to provide an open passage from said orifice to the atmosphere upon movement of said member to operate said release valve means.

3. The combination with a fluid pressure release valve device including a casing having a discharge opening and a movable member for operating said discharge valve device, of a flexible shield surrounding said opening and secured at one end to the casing and at the other end to said movable member, said shield having a plurality of normally closed slits formed therein, said shield being adapted to be flexed for opening one or more of said slits upon movement of said operating member.

4. In a fluid pressure release valve device, in combination, a casing having a discharge orifice through which fluid under pressure may flow and a cylindrical flange formed concentrically of and surrounding said orifice, a movable member for actuating said valve device having one end extending through said orifice and operatively mounted within said casing, and a circular shield made of resilient material and carried by said movable member, the periphery of said shield being adapted normally to engage the inner surface of said cylindrical flange, whereby upon movement of said member to operate the release valve device said shield is flexed so that a portion of the shield is moved out of engagement with said flange to provide an opening for permitting fluid under pressure to flow through said orifice to the atmosphere.

5. In a fluid pressure release valve device, in combination, a casing having a discharge orifice through which fluid under pressure may flow and an outer flat sealing surface surrounding said orifice, a movable member for actuating said release valve device having one end extending through said orifice and operatively mounted within the casing, and a cup-shaped shield made of resilient material carried by said member, said shield having a flexible annular lip adapted yieldingly to engage the sealing surface for closing said orifice and for urging said movable member to a normal position, whereby on operation of said member a portion of the lip of said shield is flexed away from said sealing surface to provide a passage for the flow of fluid through said discharge orifice to the atmosphere.

CARLTON D. STEWART.
ROY R. STEVENS.